US007190139B2

(12) United States Patent
Mommaerts

(10) Patent No.: US 7,190,139 B2
(45) Date of Patent: Mar. 13, 2007

(54) LEARNING METHOD FOR A MOTORIZED SCREEN WITH ORIENTABLE SLATS AND DEVICE THEREFOR

(75) Inventor: Dirk Mommaerts, Rottenburg-Seebronn (DE)

(73) Assignee: Somfy SAS, Cluses (FR)

( * ) Notice: Subject to any disclaimer, the term of this patent is extended or adjusted under 35 U.S.C. 154(b) by 284 days.

(21) Appl. No.: 11/009,312

(22) Filed: Dec. 10, 2004

(65) Prior Publication Data

US 2005/0146299 A1 Jul. 7, 2005

(30) Foreign Application Priority Data

Dec. 12, 2003 (FR) .................................. 03 14592

(51) Int. Cl.
*G05B 5/00* (2006.01)

(52) U.S. Cl. ...................... 318/466; 318/468; 318/472; 318/445

(58) Field of Classification Search ................ 318/466, 318/468, 472, 445, 560, 567, 570; 160/DIG. 17, 160/168.1 P, DIG. 4
See application file for complete search history.

(56) References Cited

U.S. PATENT DOCUMENTS 6,679,994 B1 * 1/2004 Turco et al. ................ 210/767
2001/0023842 A1 * 9/2001 Singleton .................... 210/163

FOREIGN PATENT DOCUMENTS

DE 38 01 560 A 8/1989
EP 0 574 637 12/1993
EP 0 273 719 A 7/1998

* cited by examiner

*Primary Examiner*—Karen Masih
(74) *Attorney, Agent, or Firm*—Frommer Lawrence & Haug LLP; Ronald R. Santucci

(57) ABSTRACT

The learning method is one which comprises an action of the installer having at least as consequences the ending of the powering of motor controlling the translational movement of the slats in the direction of extending, if this movement is in progress, and/or the initialization of a motor displacement amplitude or activation time counter, and, so long as this action is maintained; the powering of a motor for controlling the orientation displacement of the slats of the screen, the incrimentation of the counter, then when this second action ceases; the recording of the value of the counter in a register for storing a data relating to the total orientation travel, the powering of the motor controlling the translational moment of the slats in the direction of retracting, if the action has not brought an end to a translational movement of the slats in the direction of extending.

9 Claims, 4 Drawing Sheets

LEARNING METHOD FOR A MOTORIZED SCREEN WITH ORIENTABLE SLATS AND DEVICE THEREFOR

BACKGROUND OF THE INVENTION

The invention relates to a learning method for the control of a motorized and mobile screen with orientable slats, the screen being moveable between two extreme positions referred to as "extended" and "retracted" and the slats being orientable between two extreme positions about their longitudinal axes, in which method the entry into learning mode is achieved through a first action of the installer. Its subject is also a control unit and a motorized screen allowing the implementation of these methods.

DESCRIPTION OF THE PRIOR ART

Various types of screen with orientable slats exist. A first type is characterized by horizontal slats disposed parallel to one another. These are for example Venetian blinds or jalousies. A second type is characterized by vertical slats disposed parallel to one another. The method which is the subject of the invention applies equally to screens of the first type and to screens of the second type.

In screens of the first type, the slats are vertically mobile about their longitudinal axes. The movements of these slats are controlled by a mechanical device situated above the slats. This mechanical device comprises at least one winding drum and one rocker. The winding drum allows the winding of cords controlling the vertical translational movement of the lower slat, this slat being suspended by the cords. The rocker controls the deformation of flexible structures disposed vertically substantially at the ends of the slats, embodied as cords and exhibiting forms comparable to ladders. These flexible structures exhibit uprights and rungs on which the slats of the screen rest. The deformation of the structures is controlled by the rotation of the rocker inducing a vertical translational movement of the uprights with respect to one another. This gives rise to an angular displacement of the slats, the latter remaining parallel to one another. The flexible nature of the structures also allows, through their deformation, the slats to stack one above the other when an upward vertical displacement of the lower slat is instructed through the winding of the cords onto the winding drum.

The type of screen described above may be motorized. Thus, the translational displacement of the slats and their angular orientational displacement about their longitudinal axes may be controlled by way of a remote control.

This screen may be motorized by virtue of two motors: a first controlling the rotation of the winding drum and bringing about, as a consequence, the vertical translational movement of the slats and a second controlling the rotation of the rocker and bringing about, as a consequence, the orientational movement of the slats.

This screen may also be motorized by virtue of a single motor. In this case, the winding drum and the rocker are actuated by the same motor, the rocker being mounted, between two end stops, frictionally on the winding drum. Thus, the slats of the screen are displaced in terms of orientation upon changes of direction of the motor. As a consequence of this manner of operation, a user of this type of screen must firstly instruct the motor to rotate in a first direction so as to set the extending of the screen in front of the window bay, then, secondly, must instruct the motor to rotate in the second direction so as to set the desired orientation of the slats.

According to the screens, the characteristics of the drums, of the rockers, of the slats and of the translational displacement travels are different and influence the durations of activation of the motor or motors for bringing the slats into a determined position. Likewise, the characteristics of the motors and of the reduction gears used at the output of these motors may vary and have an influence on the duration of activation of the motor or motors for bringing the slats into a determined position.

It is understood that within the context of installation comprising several motorized screens, the management of whose controls is automated (so as to satisfy for example visual comfort or thermal optimization criteria), it is necessary to be able to ascertain and control both the position of the lower slat and the orientation of the slats of the screens.

Document EP 0 574 637, the content of which is incorporated by reference, discloses a method of determining the travel of a motorized roller blind. In this method, the activation time of a motor driving the blind is measured between the top end stop and the bottom end stop of the blind.

SUMMARY OF THE INVENTION

The aim of the invention is to provide a very simple learning method for the control of the displacements of the slats of a screen with orientable slats regardless of the characteristics thereof. The invention proposes in particular a learning method making it possible to determine certain characteristics of a screen. The invention also proposes a control unit and a motorized screen allowing the implementation of the learning method.

After a first action of the installer bringing about the entry of the motorized and mobile screen into a learning mode, the learning method according to the invention is one which comprises a second action of the installer having at least as consequences:

the ending of the powering of a motor controlling the translational movement of the slats in the direction of extending, if this movement is in progress, and/or the initialization of a motor displacement amplitude or activation time counter, and, so long as this second action is maintained:

the powering of a motor for controlling the orientational displacement of the slats of the screen, the incrementation of the counter, then, when this second action ceases:

the recording of the value of the counter in a register for storing a data relating to the total orientational travel, the powering of the motor controlling the translational movement of the slats in the direction of retracting, if the second action has not brought an end to a translational movement of the slats in the direction of extending.

Various modes of execution of the method are defined by the dependent claims.

The control unit according to the invention comprises a processing logic unit, at least two memory areas, an input allowing the acquisition of control orders and at least one output for the control of a motor. It is one wherein the processing logic unit is programmed to implement the method defined above.

The control unit can comprise inputs allowing the acquisition of signals delivered by sensors.

The screen according to the invention is motorized and mobile. It exhibits orientable slats and can be moved between two extreme positions referred to as "extended" and "retracted". The slats are orientable between two extreme positions about their longitudinal axes. The screen is one which comprises a control unit defined above linked, on the one hand, to a remote control and, on the other hand, to at least one motor for controlling the movements of the slats.

DESCRIPTION OF THE DRAWINGS

The drawing represents, by way of example, two embodiments of a motorized screen with orientable slats according to the invention and three modes of execution of a learning method according to the invention.

DESCRIPTION OF THE PREFERRED EMBODIMENTS

Figure 1:
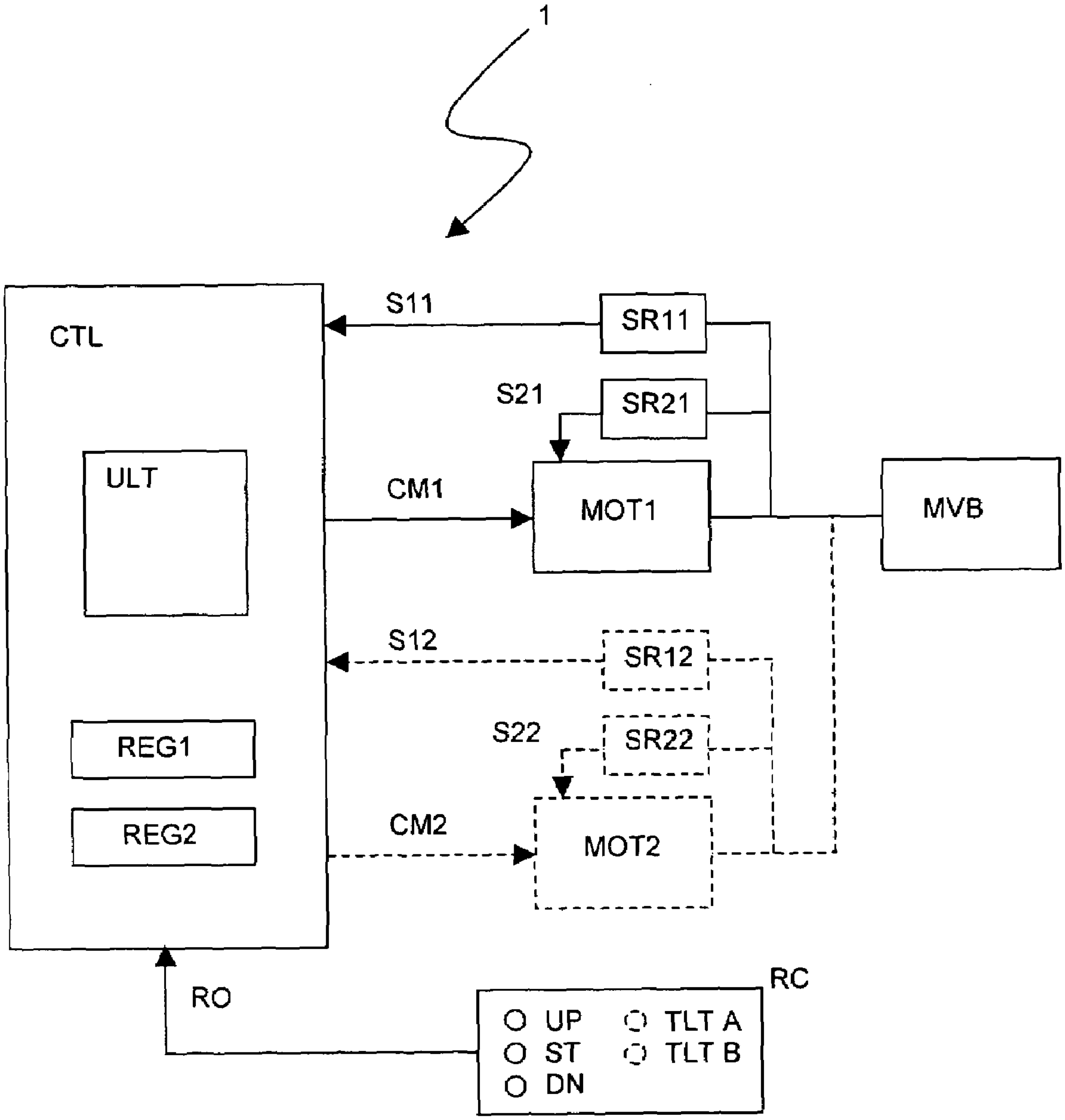
FIG. 1 is a diagram of an embodiment of a motorized screen with orientable slats according to the invention.

The motorized screen device 1 represented in FIG. 1 comprises a screen MVB with orientable slats such as a Venetian blind, the translational and orientation movements of whose slats are controlled by one and the same electric motor MOT1 via a reduction gear (not represented). The powering of the motor MOT1 is controlled by a control unit CTL via a control line CM1.

The control unit CTL comprises a processing logic unit ULT furnished with inputs and outputs, such as a microcontroller able to carry out the counting of time or to detect events. This control unit comprises various registers and in particular a register REG1 and a register REG2 containing respectively a data characterizing the length of the screen or the limit travel that the lower slat of this screen has to traverse and a data characterizing the amplitude of orientation of the slats.

The control unit CTL acts on the powering of the motor MOT1 to bring about its rotational movement in one or other direction. The motor may be of the DC type or of the AC type. The means for plugging the motor into a voltage source allowing the motor to be rotated in two directions are well known to the person skilled in the art so that their description is not repeated here. The control line CM1 can make it possible to transmit three types of orders to the motor: a rotation order making it possible to raise the screen CMUP, a rotation order making it possible to lower the screen CMDN and a motor stop order CMST.

One or more rotation sensors may be disposed in such a way as to measure the amplitude of rotation of the motor and to deduce therefrom the position of the screen. An electronic sensor, incremental or absolute, SR11 is for example placed at the level of the shaft of the motor, the signal emanating from this sensor feeding into an input of the control unit CTL by way of a link S11. An adjustable mechanical sensor SR21 makes it possible to cut the power to the motor when the screen reaches its so-called "retracted" top extreme position. This sensor is linked to the motor by a line S21.

A remote control box RC comprises a keypad with three control buttons. An UP button makes it possible to control the raising of the screen, an ST button makes it possible to control the stopping of the movements of the screen and a DN button makes it possible to control the lowering of the screen. A link RO which may be a wire link or embodied by way of electromagnetic waves permits communication to the control unit CTL.

In the operating mode of the device, pressing the UP button brings about, in the control unit, a control order CMUP for powering the motor so as to raise the screen, pressing the DN button brings about, in the control unit, a control order CMDN for powering the motor so as to lower the screen and pressing the ST button brings about, in the control unit, a control order CMST for stopping the motor.

As stated, a control order CMUP respectively CMDN, will bring about firstly an orientational movement of the slats if it follows a phase during which a control order CMDN, respectively CMUP, was executed.

A second embodiment of a motorized screen is represented in FIG. 1, supplemented with the dashed blocks. The motorized screen device then comprises two distinct motors, a first MOT1 is intended for the vertical translational displacement of the slats and a second MOT2 being intended for the orientational displacement of the slats.

In this case, the control box RC exhibits two additional buttons TLT A and TLT B respectively controlling the orientational displacement of the slats in two opposite directions. The motor for orienting the slats acts only on the rocker. Sensors of end of rocking travel SR22 cutting the power to the orientation motor MOT2 are envisaged for example at the level of the rocker. An electronic sensor, incremental or absolute SR 12, is for example placed at the level of the shaft of the motor, the signal emanating from this sensor feeding into an input of the control unit CTL.

Figure 2:
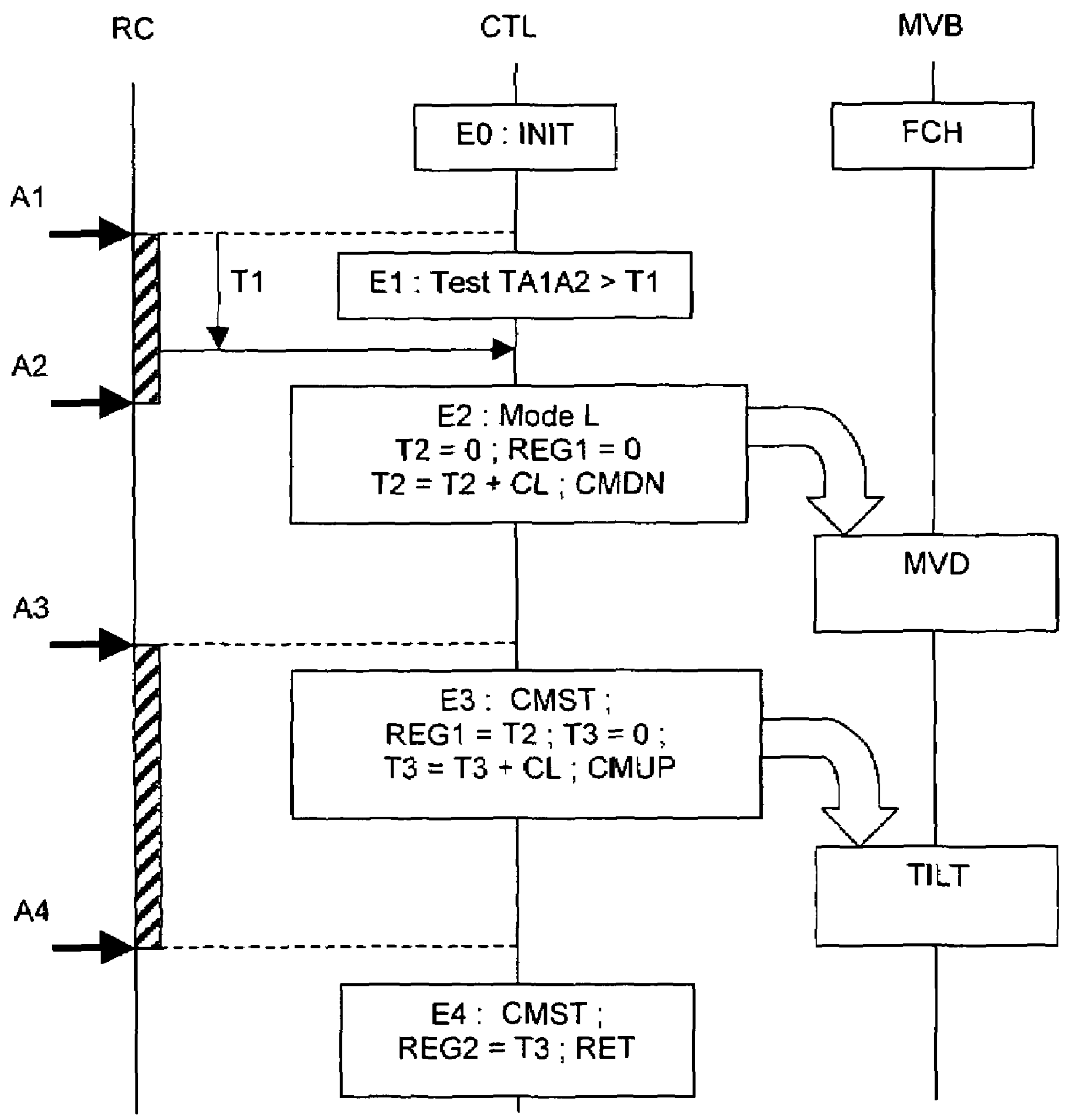
FIG. 2 is a flowchart of a first mode of execution of the learning method according to the invention.

A first mode of execution of the learning method according to the invention is described with reference to FIG. 2.

On the left, a first vertical line represents the actions of the user on the control box RC. In the middle, a second vertical line represents the method steps performed at the level of the control unit CTL. On the right, a third vertical line represents the movements made by the screen MVB. Time flows vertically from top to bottom in this diagram.

For the implementation of this mode of execution, it is not necessary for the motorized screen device to be furnished with the electronic position sensor SR1. Specifically, the control of the rotation of the motor or motors is managed by way of the activation times of the motor or motors. Thus, in the case of a screen with one motor, the position of the lower slat of the screen and the orientation of the slats are defined by a first duration of activation of the motor in the direction of lowering of the screen from the retracted position of the screen and by a second duration of activation of the motor in the other direction. In the case of a screen with two motors, the position of the lower slat of the screen is defined by a duration of activation of the motor MOT1 for lowering the screen from the retracted position of the screen and the orientation of the slats is defined by a duration of activation of the motor MOT2 for orienting the slats from their position of extreme orientation. The data characterizing the maximum amplitudes of the movements of the slats are stored in the registers REG1 and REG2 during the learning method described hereinbelow.

It is assumed firstly that the installer has brought the screen into the top position FCH referred to as "retracted", or else that the product is delivered and installed in this position. In a first step E0, the control unit is initialized for example by being switched on. In this initialization step, the control unit becomes able to receive orders from the control box RC.

The installer then exerts an action on one of the buttons of the control box RC, for example on the stop button ST for a duration at least greater than a preset value T1 equal to six seconds. The start of the action is represented by the arrow A1 and the end of the action is represented by the arrow A2. The start of the action on the button has the effect of causing the control unit to go to a step E1. In this step, the button activation time is measured and if it is greater than the value T1, a step E2 is activated. In this step E2, the control unit CTL goes to learning mode "mode L". The register REG1 is set to zero. A time counter T2 is set to zero. An extending command CMDN is sent to the motor which is activated. The slats of the screen MVB then move downwards as represented by the movement MVD.

For the installer, step E2 appears to be instantaneous. According to variants, it may be instigated as soon as the pressing exceeds the duration T1 or else as soon as the installer releases the button.

The time counter T2 is incremented regularly in tempo with a clock CL throughout the duration of activation of the motor.

When the lower slat of the screen reaches the position desired by the installer as so-called "extended" bottom position FCB, he immediately presses the stop button ST of the control box again. He then keeps the button pressed.

The action on the button is represented by the arrow A3 and immediately causes the control unit to go to step E3. In this step, the motor is instructed to stop. The value of the time counter T2 is recorded in the register REG1. A time counter T3 is set to zero. A command to rotate the motor in the opposite direction CMUP is generated so as to obtain an orientational movement of the slats. In the case of a motorized screen with two motors, the motor for orienting the slats is activated. The orientation of the slats of the screen is then gradually modified, as represented by the movement TILT. In the case of a screen exhibiting a single motor, the motor will advantageously be activated in this phase at reduced speed.

For the installer, all the sequences of step E3 appear to be instantaneous. Stated otherwise, he sees the screen cease its down movement when he presses the stop button ST, then he sees the slats change orientation, going from a first closed extreme position to a second closed extreme position, going via a position of maximum opening.

The time counter T3 is incremented regularly in tempo with the clock CL throughout the duration of activation of the motor.

When the second closed position is reached, the installer immediately releases the stop button ST, this being represented by the arrow A4 and which brings about the switch to step E4.

In this step E4, a stop command CMST is given to the motor and the value of the time counter T3 is recorded in the register REG2. The learning method is then terminated, this being symbolized by the instruction RET for returning the control unit to an operating mode.

Thus, it is noted that, independently of a first customary maneuver of the installer A1–A2 allowing entry to the learning mode, a second maneuver A3–A4 is sufficient to input into the control unit, the data essential to proper management of the subsequent control commands of the screen. This ergonomics is therefore particularly simple.

Figure 3:
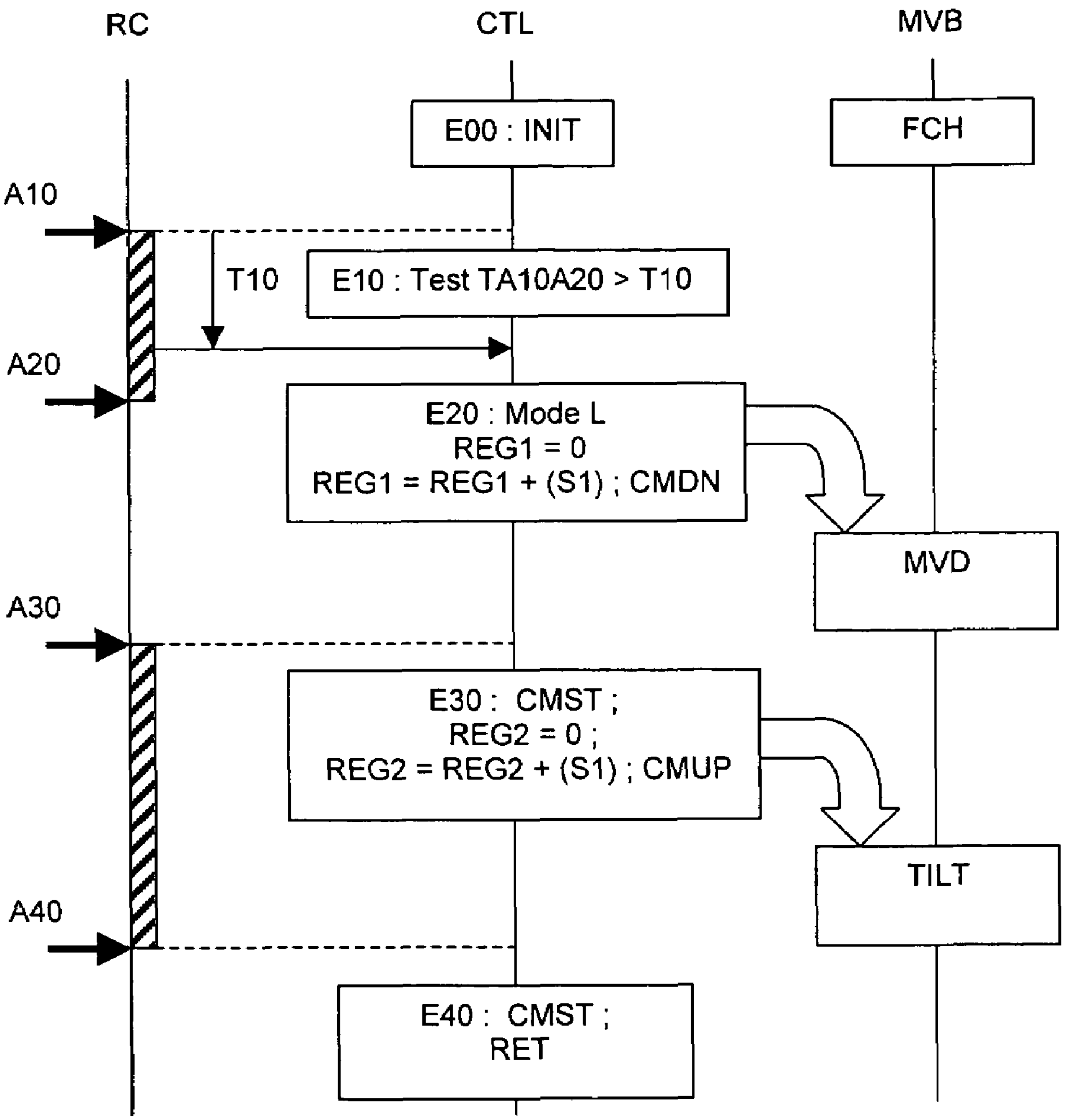
FIG. 3 is a flowchart of a second mode of execution of the learning method according to the invention.

A second mode of execution of the learning method according to the invention is described with reference to FIG. 3. This second mode of execution differs from the first in that the positions of the slats of the screen are no longer determined by times of activation of motors but by signals transmitted by sensors determining the amplitudes of the movements of the motor or motors.

The indices of action or steps that are equivalent to the previous mode of execution have been multiplied by 10.

These sensors SR11, SR12 are for example of incremental type. The number of increments transmitted over the line S1 has been represented by (S1). The increments are added directly to the register REG1 previously set to zero in the down step E20 during which the screen descends, and are directly added to the register REG2 in the screen orientation step E30. In the case of a motorized screen with two motors, it is the increments of the sensor SR12 of the orientation motor that are directly added to the register REG2 in step E30.

The two modes described are amenable to numerous variants regarding the choice of the button or buttons to be activated, regarding the mode of entry to the learning mode, regarding exit from the learning mode.

The learning procedure may for example be instigated from a position that might possibly not be the so-called "retracted" extreme top position FCH but an intermediate position.

For example, in the case of a motorized screen with a single motor, the method then starts with a lowering of the screen, but without counting, an action on the stop button ST causes the lowering to stop and the motor to be powered in the reverse direction, giving the orientational movement of the slats, with counting of duration or of the number of corresponding pulses. The ending of the pressing of the stop button leaves the powering of the motor active, in such a way as to allow ascent to the top position FCH, and the counting making it possible to ascertain the data relating to the total translation travel is activated in this raising phase.

Stoppage in the "retracted" top position is then obtained either by action of the installer on the stop button ST, or by a mechanical sensor SR21 detecting the end of travel. The control unit is then informed by known means that the motor is no longer powered and the count value is recorded in the register REG1 on completion of the raising movement.

A variant may also combine the previous cases by traversing a complete down and up cycle. Specifically, step E4 may contain not a stop command but the initialization and the setting in place of a count making it possible to load a third register REG3, not represented, with the value of the raising time, this possibly proving useful if the power of the motor is not sufficient to guarantee similar up and down durations.

Figure 4:
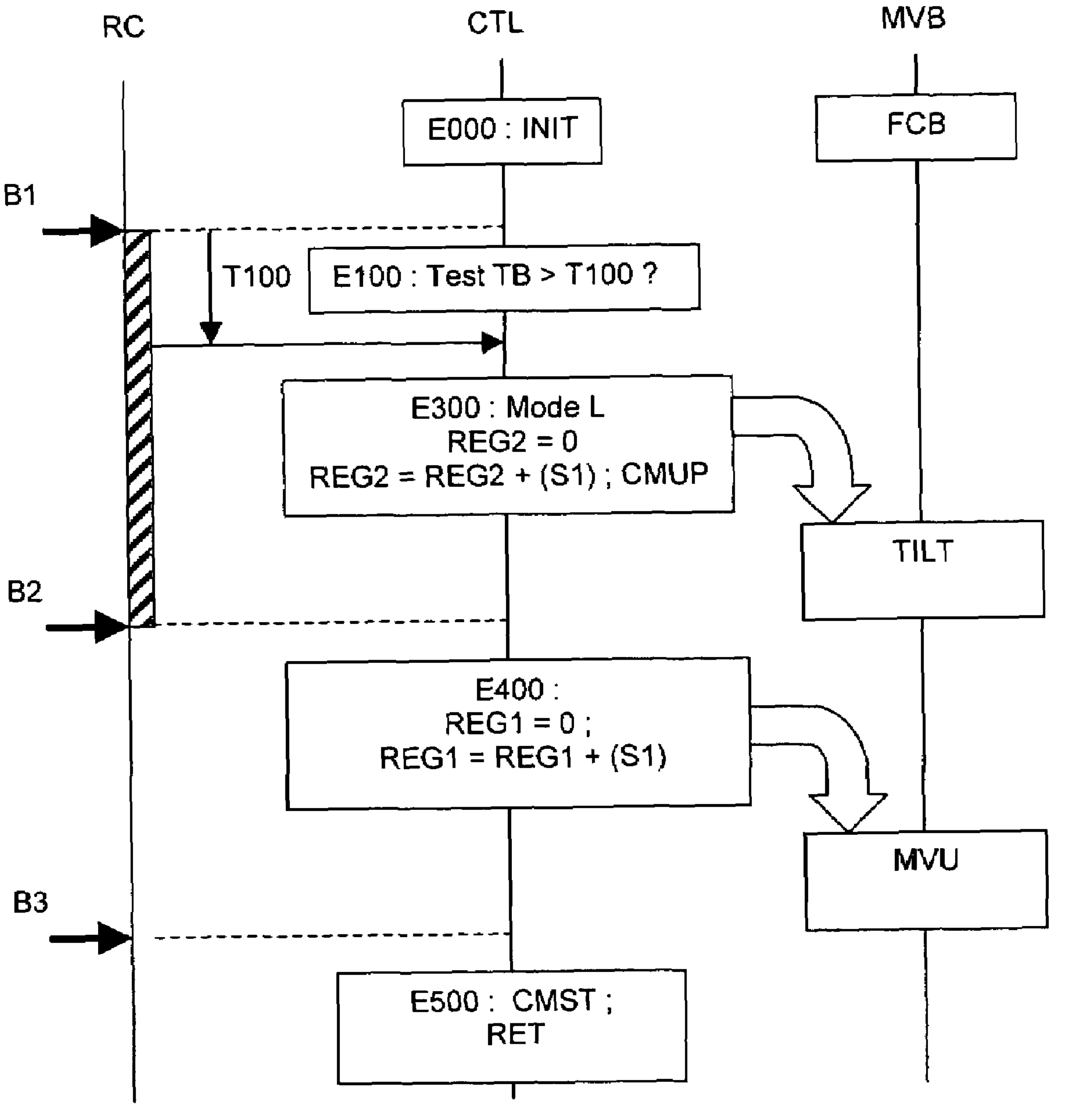
FIG. 4 is a flowchart of a third mode of execution of the learning method according to the invention.

Another embodiment, represented in FIG. 4, can also consist in launching the learning cycle from the bottom position FCB that the installer has chosen by giving a stop command while the screen is moving down. As in all the previous cases, the control buttons have their normal function of orders to move or to stop while the learning mode is not instigated. The installer therefore has every leeway for approaching the chosen bottom position, by successive down and stop orders.

Once in a bottom position FCB, the installer presses for example the stop button for at least six seconds so as to enter the learning mode. The start of the pressing is represented by the arrow B1. In the case of this embodiment, the learning mode commences directly with the step of powering the motor bringing about the orientation of the slats E300, that is to say for example a powering of the motor in the direction of the raising of the slats in the case of a blind with a single motor. In this step the register REG2 is initialized to zero.

This time, it is the timeout T100 for testing the duration of pressing of the button which is substituted for the previous actions A2 A3. Stated otherwise, the installer keeps his finger pressed on the same control button ST: for six seconds, nothing happens, then an order to power the motor in the direction of retracting CMUP is given, this bringing about the orientational movement of the slats TILT. During this movement, the second register REG2, which serves directly as counter, is incremented.

When the orientational movement of the slats ceases, the installer releases the button, this being represented by the action B2. We then go to step E400 in which the counter REG2 is no longer incremented and in which the value of the counter is stored, this value corresponding to the total orientational travel. The first register REG1, which serves directly as counter is initialized to zero then incremented as long as the powering of the motor is maintained. In this step, there is only retracting movement of the screen represented by the rectangle MVU.

When the screen arrives in the top position, the installer exerts a new action on a button, preferably the stop button ST, this being represented by the arrow B3. This action triggers a step E500, in which an order to stop the supplying of the motor is generated. The register REG1 then stores its last value. The latter corresponds to the total translational travel. The learning cycle is then terminated.

The term "action" should be interpreted in the broad sense. Thus, the pressing of a button, the releasing of a button, the maintaining of a button in the pressed state are different types of actions.

If two different motors are used, one for translation MOT1, the other for rotation MOT2, a power command CM2 is generated in step E300 to bring about the orientational movement, then a power stop command CM2ST is generated at the start of step E400, while a command to power the translational motor MOT1 in the direction of retracting CM1UP is generated. In step E500 a command to stop the powering of the translation motor MOT1, CM1ST is generated.

According to the variants adapted for two motors, provision may be made for the installer to begin the learning cycle with the slats in the closed position, or in any orientation whatsoever. In this case, the learning cycle commences with the generation of a command CM1 allowing the closure of the slats before any counting.

The control unit CTL may be embodied according to numerous variants and may moreover be integrated into the same mechanical assembly as the motor. Conversely, the control unit may be a centralized control commanding several screens. In this centralized control there will then be as many pairs of registers as different screens. If various control units intercommunicate by way of a home automation network, these values may be duplicated in all the units liable to control a screen with the same characteristics.

The remote control box RC may be linked to the command device CTL by wire or wireless link, or even be contained in the control unit. The link between the control unit and the motor may also be effected by wireless means.

The method has been described in the case where the stop button ST of the control box is used to instigate the second action. It is equally possible to use a specific button, for example a button dedicated to the learning mode, or else to use a movement control button, such as the UP button.

If the sensors used are of absolute type, the pulse counting sequences are replaced with an initial inputting of the state of the sensor and a new inputting on completion of a step to ascertain the data sought by differencing the two values.

Preferably, the orientational movement of the slats occurs at slow speed. Thus, even in the case where a single motor is used, it may be appropriate to power the motor at a nominal voltage in order to move the slats in translation and power the motor at a reduced voltage in order to move the slats in orientation. Customary ergonomics consists in interpreting a pulse-like pressing of a movement button as an order to begin a fast-speed movement, while sustained pressing will be interpreted as a slow-speed movement order. Such ergonomics is entirely compatible with the method described.

The invention claimed is:

1. A learning method for the control of a motorized and mobile screen (1) with orientable slats, the screen (MVB) being moveable between two extreme positions referred to as "extended" and "retracted" and the slats being orientable between two extreme positions about their longitudinal axes, in which method the entry into learning mode is achieved through a first action of the installer, which method comprises a second action of the installer having at least as consequences:

the ending of the powering of a motor (MOT1) controlling the translational movement of the slats in the direction of extending, if this movement is in progress, and/or the initialization of a motor displacement amplitude or activation time counter, and, so long as this second action is maintained:

the powering of a motor (MOT1; MOT2) for controlling the orientational displacement of the slats of the screen, the incrementation of the counter, then, when this second action ceases:

the recording of the value of the counter in a register for storing a data relating to the total orientational travel (REG2), the powering of the motor (MOT1) controlling the translational movement of the slats in the direction of retracting, if the second action has not brought an end to a translational movement of the slats in the direction of extending.

2. The method as claimed in claim 1, wherein the second action of the installer is a pressing of a button of a control box (RC) or the continuation, beyond a timeout of the first action.

3. The method as claimed in claim 1, wherein one and the same motor (MOT1) brings about the translational movement and the orientational movement of the slats and wherein the orientational movement is obtained by reversing the direction of rotation that brought about the translational movement.

4. The method as claimed in claim 1, wherein the first action of the installer is performed from a retracted extreme position and wherein a consequence thereof is the initialization and the incrementation of a motor displacement amplitude or activation time counter, the powering of a motor controlling the translational movement of the slats in the extending direction, while the start of the second action of the installer also has as consequence the recording of the value of the counter in a register (REG1) for storing a data relating to the total translational travel.

5. The method as claimed in claim 1, wherein the end of the second action of the installer has as consequence the powering of a motor controlling the translational movement of the slats in the direction of retracting, the initialization of a motor displacement amplitude or activation time counter then the incrementation of this counter, whose content is assigned to a register (REG1, REG3) for storing a data relating to the total translational travel at the moment at which this powering of the motor controlling the translational movement of the slats ceases.

6. The method as claimed in claim 1, wherein the first action of the installer is performed from an extended extreme position and wherein the end of the second action of the installer has as consequence the powering of a motor controlling the translational movement of the slats in the direction of retracting, the initialization of a motor displacement amplitude or activation time counter, then the incrementation of this counter, whose content is assigned to a register for storing a data relating to the total translational travel (REG1) at the moment at which the powering of the motor controlling the translational movement of the slats ceases.

7. A control unit (CTL) comprising a processing logic unit (ULT), at least two memory areas (REG1, REG2), an input (RO) allowing the acquisition of control orders, at least one output (CM1; CM2) for the control of a motor (MOT1; MOT2), wherein the processing logic unit (ULT) is programmed to implement the method as claimed in claim 1.

8. The control unit as claimed in claim 7, which comprises inputs (S11; S12) allowing the acquisition of signals delivered by sensors (SR11; SR12).

9. A motorized and mobile screen (1) with orientable slats, that can be moved between two extreme positions referred to as “extended” and “retracted” and whose slats are orientable between two extreme positions about their longitudinal axes, comprising a control unit as claimed in claim 7 linked on the one hand to a remote control (RC) and, on the other hand, to at least one motor (MOT1; MOT1, MOT2) for controlling the movements of the slats.

* * * * *